(12) United States Patent
Williams et al.

(10) Patent No.: US 8,152,214 B2
(45) Date of Patent: Apr. 10, 2012

(54) GRIPPER WITH SELF-COMPENSATING JAW GUIDES

(75) Inventors: Matthew R. Williams, Fort Wayne, IN (US); Lyle A. Null, Markle, IN (US); Matthew Wenger, Bluffton, IN (US)

(73) Assignee: PHD, Inc., Fort Wayne, IN (US)

( * ) Notice: Subject to any disclaimer, the term of this patent is extended or adjusted under 35 U.S.C. 154(b) by 92 days.

(21) Appl. No.: 12/553,528

(22) Filed: Sep. 3, 2009

(65) Prior Publication Data

US 2010/0052348 A1    Mar. 4, 2010

Related U.S. Application Data

(60) Provisional application No. 61/094,124, filed on Sep. 4, 2008.

(51) Int. Cl.
*B25J 15/08* (2006.01)

(52) U.S. Cl. .................... 294/119.1; 294/207

(58) Field of Classification Search .............. 294/88, 294/119.1, 192, 207; 269/32, 34, 234; 901/31, 901/37

See application file for complete search history.

(56) References Cited

U.S. PATENT DOCUMENTS

| | | | | |
|---|---|---|---|---|
| 4,593,948 A | * | 6/1986 | Borcea et al. | 294/88 |
| 4,913,481 A | * | 4/1990 | Chin et al. | 294/88 |
| 5,125,708 A | * | 6/1992 | Borcea et al. | 294/88 |
| 5,529,359 A | * | 6/1996 | Borcea et al. | 294/119.1 |
| 5,967,581 A | * | 10/1999 | Bertini | 294/88 |
| 6,227,336 B1 | | 5/2001 | Rudy | |
| 6,394,521 B1 | | 5/2002 | Bertini | |
| 6,830,273 B2 | * | 12/2004 | Michler et al. | 294/88 |
| 6,880,974 B2 | | 4/2005 | Moshammer | |
| 7,029,214 B2 | | 4/2006 | Shiba et al. | |
| 2001/0016087 A1 | | 8/2001 | Akiyama et al. | |
| 2003/0030294 A1 | | 2/2003 | Michler et al. | |
| 2004/0099492 A1 | | 5/2004 | Onuki et al. | |

FOREIGN PATENT DOCUMENTS

EP    1 080 851 A1    3/2001

OTHER PUBLICATIONS

International Search Report; Nov. 2, 2009.
Supplementary European Search Report; Application No. EP 09 81 2213; date of completion of the search Dec. 5, 2011.

* cited by examiner

*Primary Examiner* — Paul T Chin
(74) *Attorney, Agent, or Firm* — Barnes & Thornburg LLP

(57) ABSTRACT

A gripper assembly which in one form includes a body, at least one jaw, a longitudinally extending wedge, and a spring. The body has a slot disposed therein and opposed longitudinally extending walls. The jaw is laterally slideable within the slot. The longitudinally extending wedge is fitted along the longitudinally extending wall. The jaw comprises a surface that is engageable with the wedge. The surface of the jaw is slideable along the wedge. And a spring biases the wedge toward the jaw to reduce the running clearance between the two structures.

9 Claims, 17 Drawing Sheets

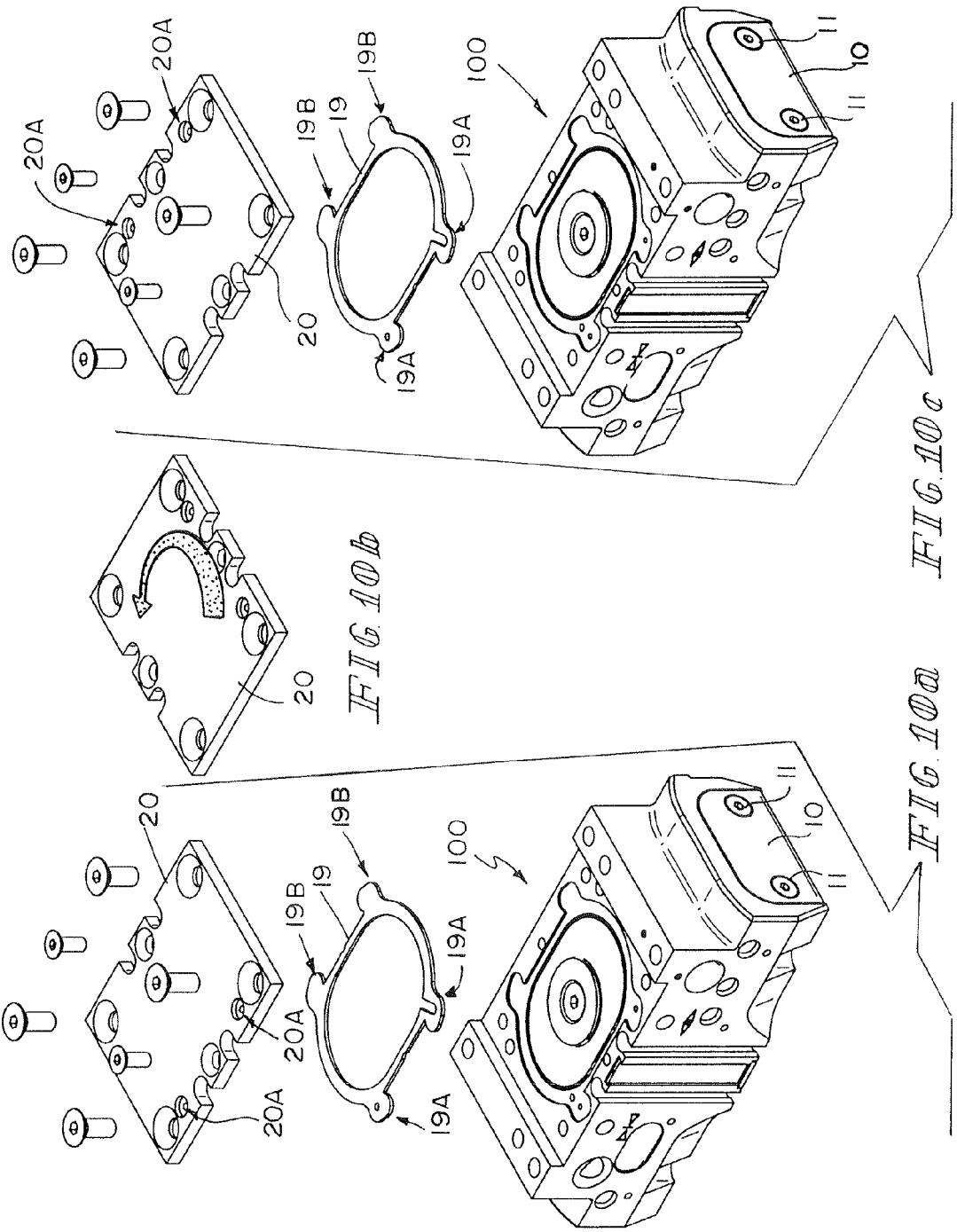

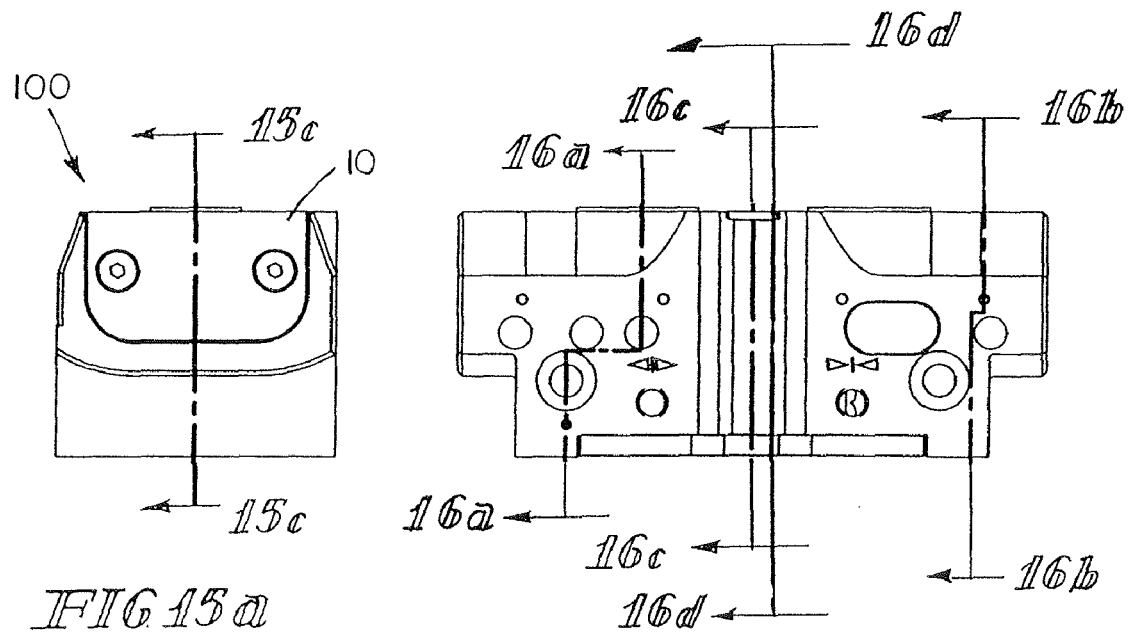
FIG.15a
FIG.15b
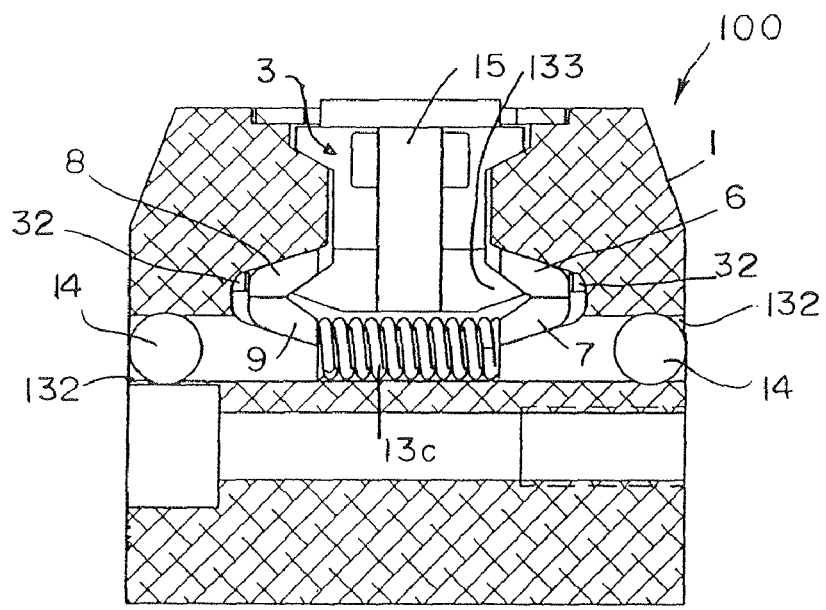
FIG.15c

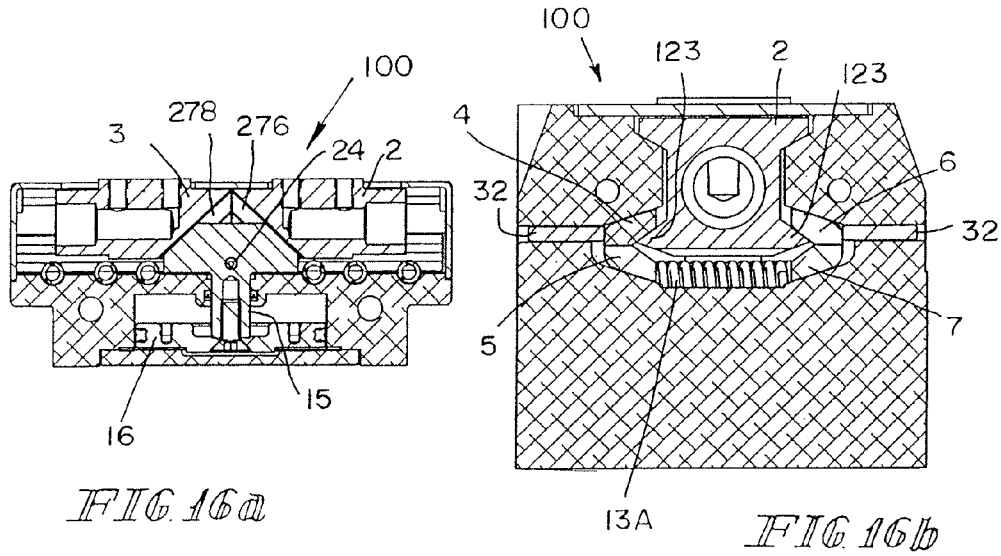
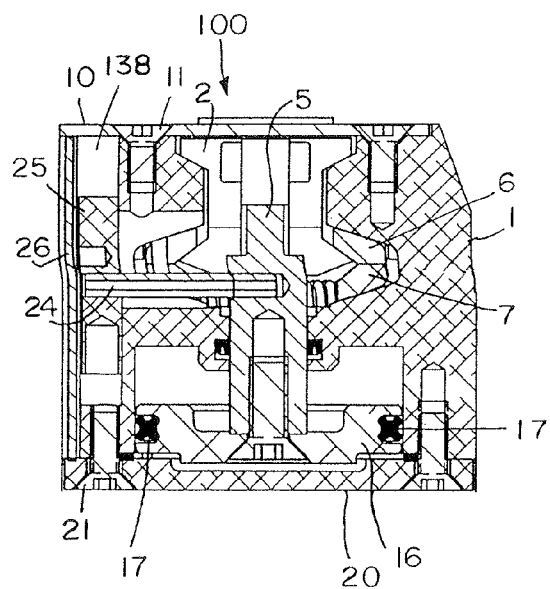
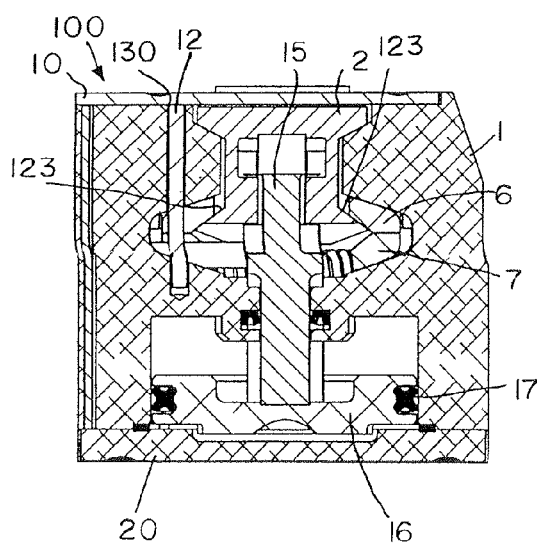

GRIPPER WITH SELF-COMPENSATING JAW GUIDES

RELATED APPLICATIONS

The present application is related to and claims priority to U.S. Provisional Patent Application Ser. No. 61/094,124 filed on Sep. 4, 2008, entitled Gripper With Self-Compensating Jaw Guides. The subject matter disclosed in that provisional application is hereby expressly incorporated into the present application.

TECHNICAL FIELD

The present disclosure is related to gripper assemblies, in particular to parallel grippers with substantially reduced running clearances between the jaws and slot walls.

Grippers are mechanical devices that include two or more jaws that grip and release a workpiece via a motive means such as an electric motor or pneumatic actuator. Parallel grippers include jaws that move in a common plane along longitudinally-extending guide surfaces. It is desirable to hold this plane as rigidly as possible so the jaws follow a predictable and repeatable path during high precision manufacturing and handling applications.

Parallel grippers may have a physical gap between adjacent contacting surfaces otherwise known as a ""running clearance" that form between the jaw and the guide surfaces due to manufacturing tolerances in these structures. The predictability and repeatability of the jaw motion is affected by the amount of running clearance there is between it and the guide.

An illustrative embodiment of the present disclosure provides an improved gripper having self-compensating jaw guides designed to "fill in" where any running clearance might otherwise be. In an illustrative embodiment, the jaw guides are discrete structures located between the jaw and the jaw guide Another illustrative embodiment of the present disclosure includes a gripper assembly which comprises a body, at least one jaw, a longitudinally extending wedge, and a spring. The body has a slot disposed therein and opposed longitudinally extending walls. The jaw is laterally slideable within the slot. The longitudinally extending wedge is fitted along the longitudinally extending wall. The jaw comprises a surface that is engageable with the wedge. The surface of the jaw is slideable along the wedge. And lastly, spring biases the wedge toward the jaw.

In the above and other illustrative embodiments, the gripper assembly may further include: jaw further comprising a projection extending from the jaw and including the surface that is engageable with the wedge; the jaw further comprising a second projection extending from the jaw and opposite the first projection; the jaw further comprising third and fourth projections extending from the jaw and spaced apart from the first and second projections; and a longitudinally extending second wedge that abuts the wedge, and wherein the spring engages the second wedge biasing it against the first wedge toward the jaw to reduce running clearance between the wedge and the jaw.

Another illustrative embodiment of the present disclosure includes a gripper assembly that comprises a body, jaw, first and second longitudinally extending wedges, third and fourth longitudinally extending wedges, and a spring. The body has a slot disposed therein and opposing walls. Each of the opposed walls include longitudinally extending recesses. The jaw is slideable within the slot. The first and second longitudinally extending wedges abut each other, positioned in one of the opposed wall recesses. The first extending wedge is configured to engage the jaw. The third and fourth longitudinally extending wedges also abut each other and positioned in the other of the opposed wall recesses. The third extending wedge is configured to engage the jaw. And the spring biases the second and fourth wedges causing a reduction of running clearance between the first and third wedges.

Additional features and advantages of the gripper will become apparent to those skilled in the art upon consideration of the following detailed descriptions exemplifying the best mode of carrying out the gripper as presently perceived.

BRIEF DESCRIPTION OF THE DRAWINGS

The present disclosure will be described hereafter with reference to the attached drawings which are given as non-limiting examples only:

FIGS. 10a-c are various views demonstrating a reversible manifold system for the gripper;

FIGS. 15a-c are various side end and end cross-sectional views of a gripper;

FIGS. 16a-d are various cross-sectional views of the gripper of FIG. 14 taken along the lines as indicated in FIG. 14a.

Corresponding reference characters indicate corresponding parts throughout the several views. The exemplification set out herein illustrates embodiments of the gripper and such exemplification is not to be construed as limiting the scope of the gripper in any manner.

DISCLOSURE OF ILLUSTRATIVE EMBODIMENTS

Figure 1:
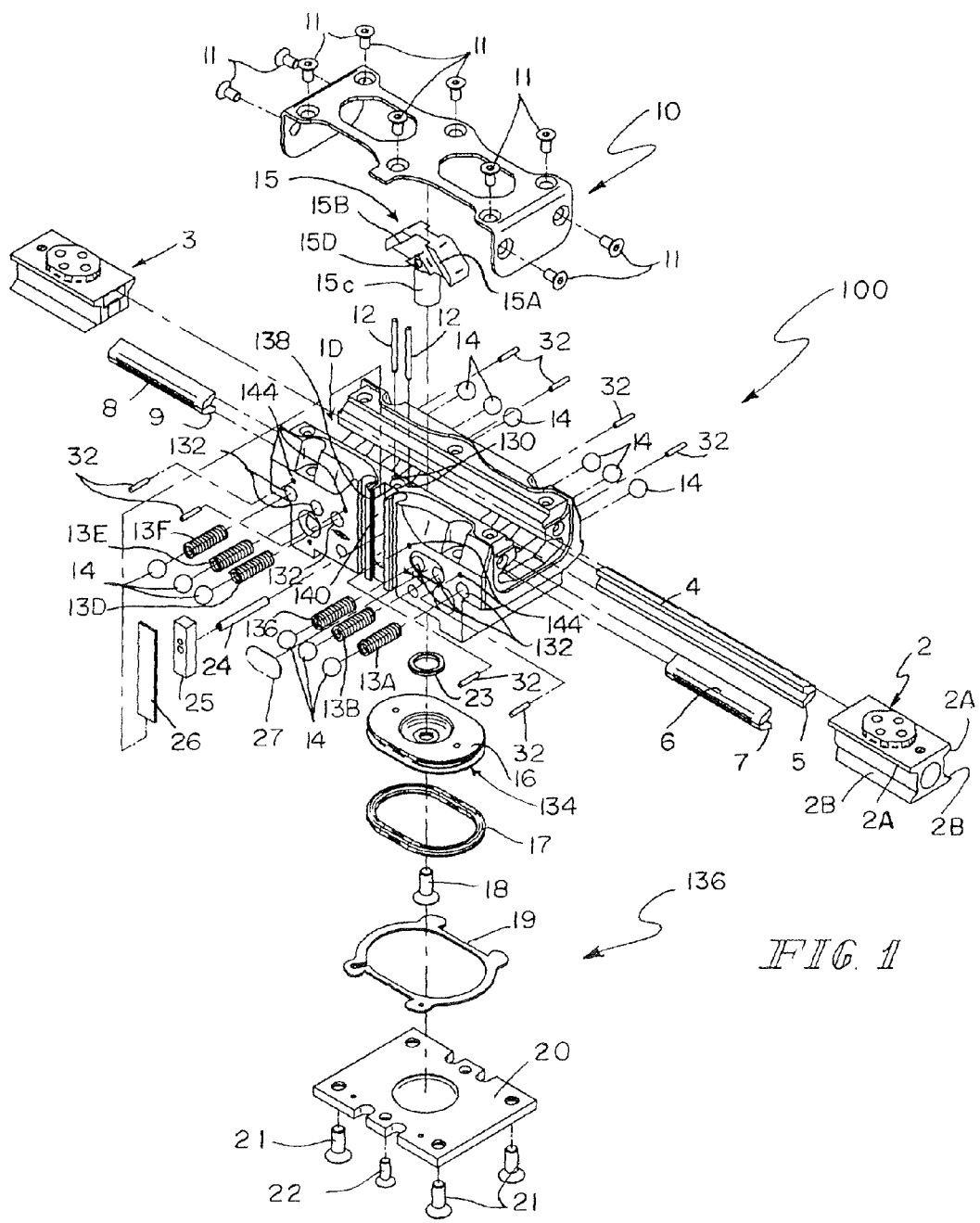
FIG. 1 is an exploded view of a parallel gripper or gripper.

An exploded view of gripper 100 is shown in FIG. 1. Jaws 2 and 3 are free to move along the length of slot 1D formed in body 1. Cover 10 is attached to body 1 illustratively via threaded fasteners 11 preventing jaws 2 and 3 from exiting body 1. Sliding wedges 4, 5, 6, 7, 8, and 9 are located within slot 1D of body 1 and are also prevented from exiting body 1 by cover 10. These wedges share a common exterior profile and can be produced by machining, extruding, casting, or molding processes, for example. Wedges 4 and 5 illustratively span the length of slot 1D. In an illustrative embodiment, wedges 6, 7, and 8 may be shorter than about one half of the length of slot 1D. Wedges 6 and 8 and wedges 7 and 9 are separated from one another by dowel pins 12, which reside in blind bores 130 in body 1.

Jaws 2 and 3 are movable with the assistance of driver 15. In an illustrative embodiment, a cylindrical shank 15C of driver 15 passes though an opening (not shown) in body 1 attaching to piston 16 via threaded fastener 18. (See e.g., FIGS. 16a, c and d). Angled cam surface 15A engages a complimentary slot 276 in jaw 2 while angled cam surface 15B engages a complimentary slot 278 in jaw 3, as shown in FIG. 16a. These form what is referred to by those skilled in the art as a "wedge-hook driver."

Springs 13A-F are each illustratively disposed through a bore 132 in body 1 to bias against the wedges, as further discussed herein. Illustratively, polymer or elastomer balls 14 are press-fit into bores 132 to cap them. This prevents contaminants from getting into the bores. Dowel pins 32 can be extended into bores 144 formed in body 1, as discussed further with respect to FIGS. 8 and 9.

An actuator assembly 136, illustratively shown as a pneumatic piston actuator, attaches to body 1 to reciprocally move driver 15 for moving jaws 2 and 3. This illustrative embodiment includes a drive seal 23 that fits into a gland (not shown) in body 1 preventing egress of motive fluid from between shank 15C of driver 15 and body 1. Seal 17 fits into gland 134 in piston 16 to seal the periphery of the piston against a complimentary profiled bore (not shown) in body 1 preventing motive fluid from entry or egress around the periphery of piston 16. Cover 20 is illustratively attached to body 1 with threaded fasteners 21 and 22. Casket 19 prevents the egress of motive fluid from between the cover and body.

Illustratively, roll pin 24 passes though vertical slot 138 on the side of body 1 and retained via press-fit into bore 15D in the side of driver 15. (See also FIG. 16c.) A switch target 25 may then be press-fit onto roll pin 24 and disposed into complimentary vertical slot 140 in body 1. The walls of slot 140 horizontally constrain target 25 only allowing vertical movement. Cover 26 is disposed in vertical slot 142 of body 1, and is illustratively prevented from exiting body 1 by cover 10 on the top and cover 20 on the bottom. Cover 26 prevents target 25 from exiting body 1 and minimizes the ingress of contaminants into vertical slot 138.

In this illustrative embodiment, the position of target 25 is determined by the vertical position of driver 15 by virtue of roll pin 24 coupling the vertical motion of the target to the driver. As motive fluid moves piston 16 and driver 15, cam surfaces 15A and 15B proportionately move jaws 2 and 3, respectively, so that the vertical position of target 25 is proportionally maintained to the horizontal position of the jaws. Switches or other sensing devices may be used to determine the vertical position of the target which may then be used to interpolate the horizontal position of the jaws. An optional label 27 is adhesively bonded into a complimentary recess in the surface of body 1 to identify the manufacturer of the gripper.

Figure 2:
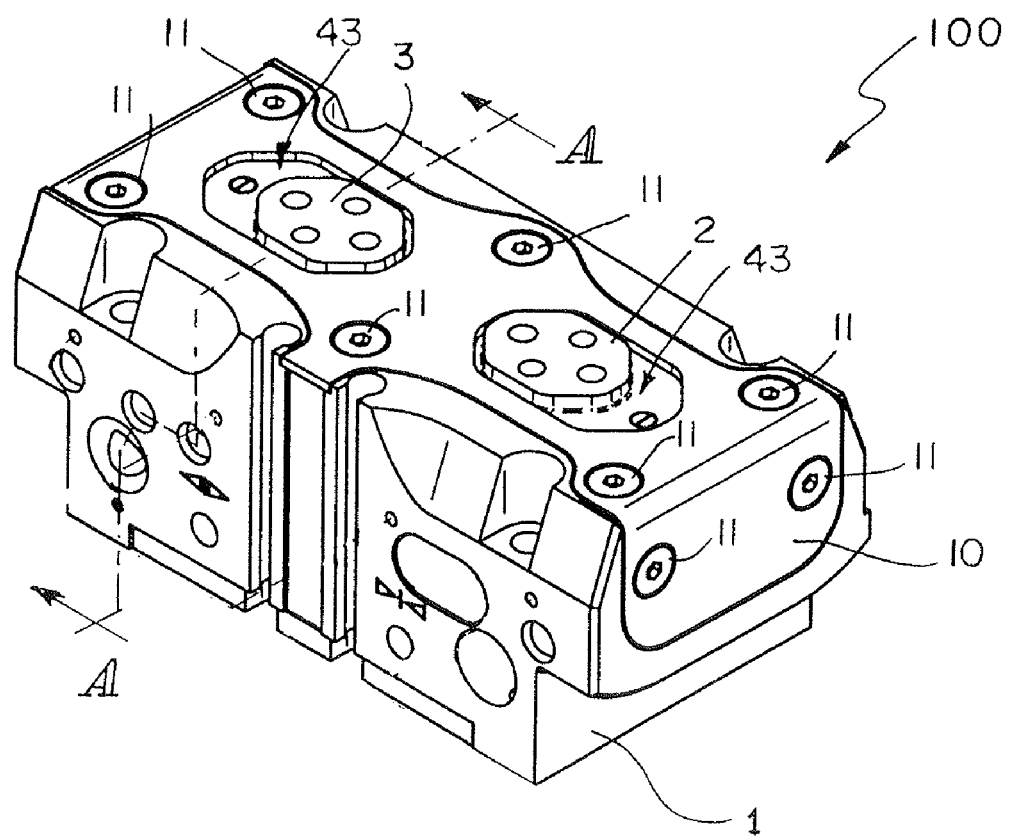
FIG. 2 is a perspective view of the gripper of FIG. 1.

A perspective view of Gripper 100 is shown in FIG. 2. This view show jaws 2 and 3 extending through slot opening 43 formed in cover 10. It is appreciated that jaws 2 and 3 can travel reciprocally toward and away from each other inside slot openings 45. It is further appreciated that a variety of mechanisms can be incorporated into jaws 2 and 3 to attach arms and/or tip to hold and release a work piece. In this illustrative embodiment, jaws 2 and 3 include bore holes to accept clamping arms. (See, also, FIG. 17.) Other attachment mechanisms may include slots, keyways, bosses, ribs, and undercuts, for example. Also shown in this view are fasteners 11 attaching cover 10 onto body 1.

Figure 3:
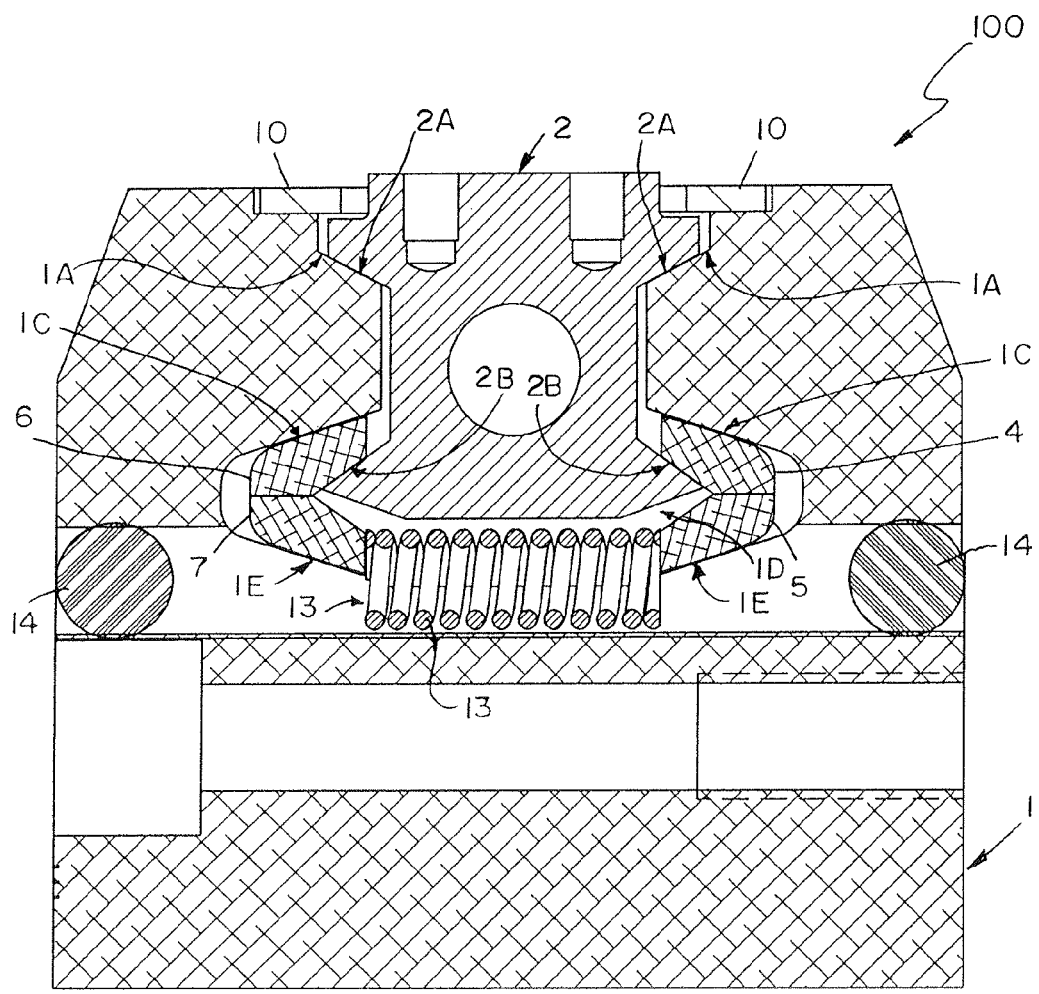
FIG. 3 is a cross-sectional end view of the gripper of FIG. 1 taken along lines A-A of FIG. 2.

A cross-sectional view of gripper 100 taken along lines A-A of FIG. 2 is shown in FIG. 3. Surface 2A of jaw 2 is illustratively complimentary to and in contact with surface 1A of body 1. Similarly, surface 3A of jaw 3 is also illustratively complimentary to and in contact with surface 1A of body 1. As shown in FIGS. 3-6, wedges 4 and 6 are disposed between surfaces 2B of jaw 2 and surfaces 1C of body 1. Surfaces 4B and 6B of wedges 4 and 6, respectively, are in contact with surfaces 2B of jaw 2. Surfaces 4C and 6C of wedges 4 and 6, respectively, are in contact with surfaces 1C of body 1. Wedges 5 and 7 are disposed between surfaces 4D and 6D of wedges 4 and 6, respectively, and surfaces 1E of body 1. Surfaces 5D and 7D of wedges 5 and 7, respectively, are in contact with surfaces 4D and 6D of wedges 4 and 6, respectively. Surfaces 5E and 7E of wedges 5 and 7, respectively, are in contact with surfaces 1E of body 1.

Figure 4:
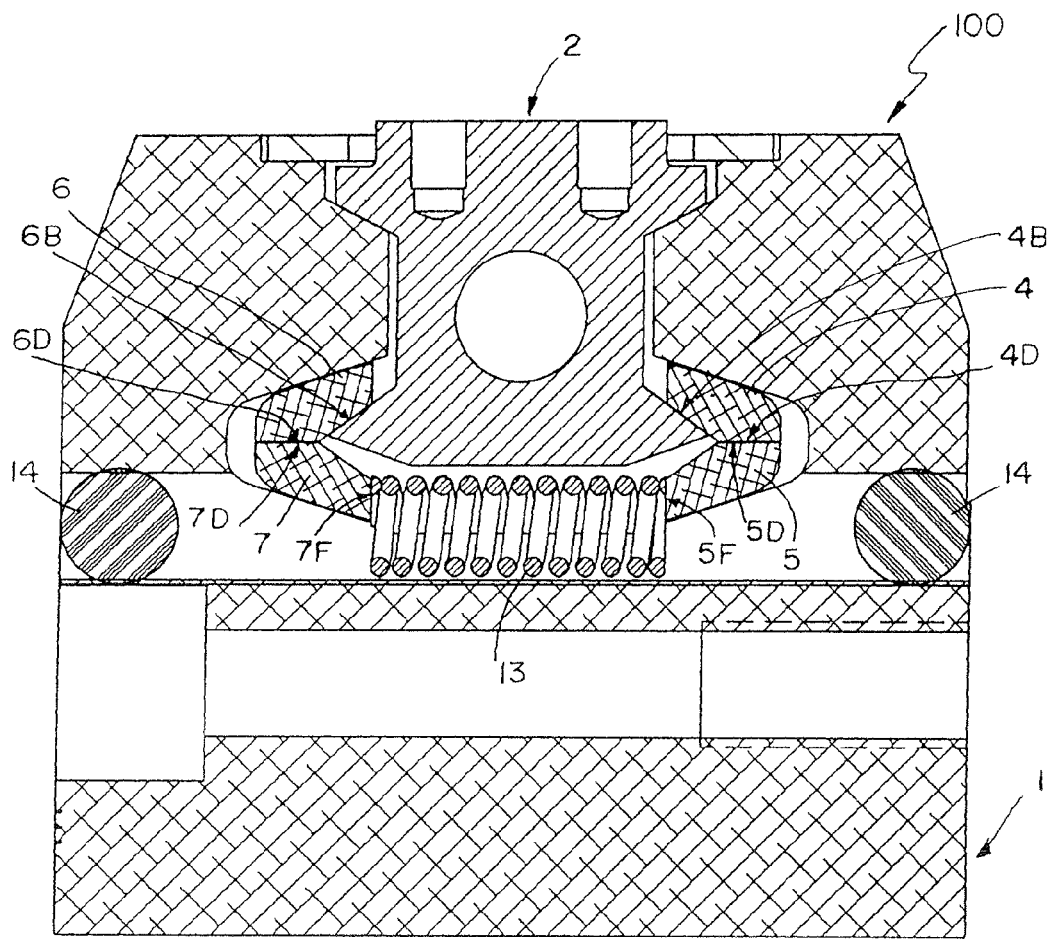
FIG. 4 is another cross-sectional end view of the gripper of FIG. 1.
Figure 5:
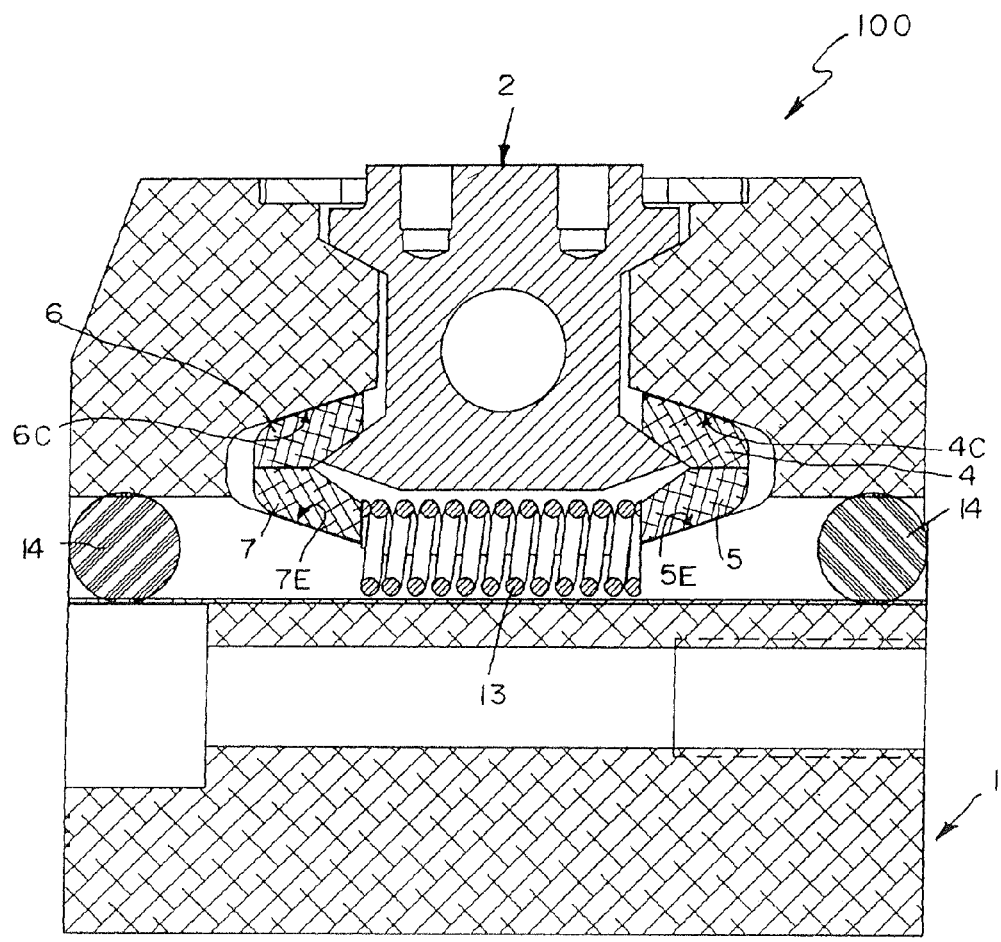
FIG. 5 is another cross-sectional end view of the gripper of FIG. 1.

Helical springs 13A, 13B, and 13C are located within correspondingly-sized bores 132 passing through body 1 and into slot 1D. Springs 13A, 13B, and 13C are disposed between wedges 5 and 7 to hold them in place. Illustratively, the ends of each spring are in contact with surfaces 5F and 7F of wedges 5 and 7, respectively, as shown in FIG. 4. The distance between surfaces 5F and 7F and length of springs 13 may be selected such that the springs are compressed beyond their free length. This causes the faces of the springs in contact with surfaces 5F and 7F to exert a predetermined force against those surfaces. Similarly, springs 13D, 13E, and 13F act upon wedges 4, 5, 8, and 9 to eliminate the running clearances between body 1 and jaw 3, and the running clearances between wedges 4 and 8 and jaw 3.

As wedges 5 and 7 are pushed apart by the forces applied to them by springs 13, contact of wedge surfaces 5E and 7E with body surfaces 1E cause surfaces 5D and 7D to push against surfaces 4D and 6D, respectively. The forces thus exerted on surfaces 4D and 6D cause wedge surfaces 4C and 6C to contact surfaces 1C of body 1. Contacting surfaces 4C and 6C with body surfaces 1C cause wedges 4 and 6 to move toward one another so that surfaces 4B and 6B push against surfaces 2B of jaw 2. The forces thus exerted on jaw surfaces 2B cause jaw 2 to move downward so that surfaces 2A push against surfaces 1A of body 1. In this manner, running clearances between body surfaces 1A and jaw surfaces 2A and running clearances between wedge surfaces 4B and 6B and jaw surfaces 2B are eliminated. Furthermore, the forces imposed on the wedges by springs 13 continually act to move the wedges in the manner previously described to eliminate running clearance which results from wearing of the running surfaces.

It should be appreciated from this disclosure that frictional forces exist at the contact surfaces described with respect to and shown in FIGS. 3-7. Friction is a force that acts to oppose impending motion. This opposition to motion progressively reduces the forces applied by springs 13A-F so that the contact forces eventually developed between the running surfaces of the wedges and jaws and body and jaws are reduced in magnitude from those originally applied to the wedges 4, 5, 6, 7, 8 and 9 by the springs 13A-F. It should further be appreciated that the contact forces between the wedges and jaws and the body and jaws also act to create friction that opposes the motion of the jaws as they slide together or apart during operation of the gripper. This running friction is proportional to the magnitude of the contact forces. Minimizing the contact forces, therefore, should reduce the deleterious effect of running friction on the performance of the gripper.

External forces and moments also act on jaws 2 and 3 during normal operation of the gripper. These forces and moments may be applied via tooling attached to the jaws as the gripper grasps objects or by linear or rotational acceleration of the gripper as the gripper is moved about as part of a manufacturing application. The external forces and moments typically generate contact forces between the contacting surfaces of the wedges and jaws that seek to displace wedge 4, or wedges 6 and 8 from their locations between body 1 and jaws 2 and 3. Displacing wedges 4, 6, and 8 displace wedges 5, 7, and 9, respectively, as well. As previously described, the motion of any wedge is opposed by friction resulting from contact forces applied to that wedge. This opposition to motion progressively reduces the displacement forces applied to wedges 4, 6, and 8 so that the resulting forces eventually developed between wedges 5, 7, and 9 and springs 13 are greatly reduced in magnitude from those originally applied to wedges 4, 6, and 8. This force reduction may allow a small magnitude spring force to prevent undesirable movement of the jaws away from the desired path of jaw motion resulting from the application of large magnitude external forces and moments. The small magnitude of the spring force simultaneously minimizes the running friction that retards the desired movement of the jaws along the desired path of jaw motion.

Figure 6:
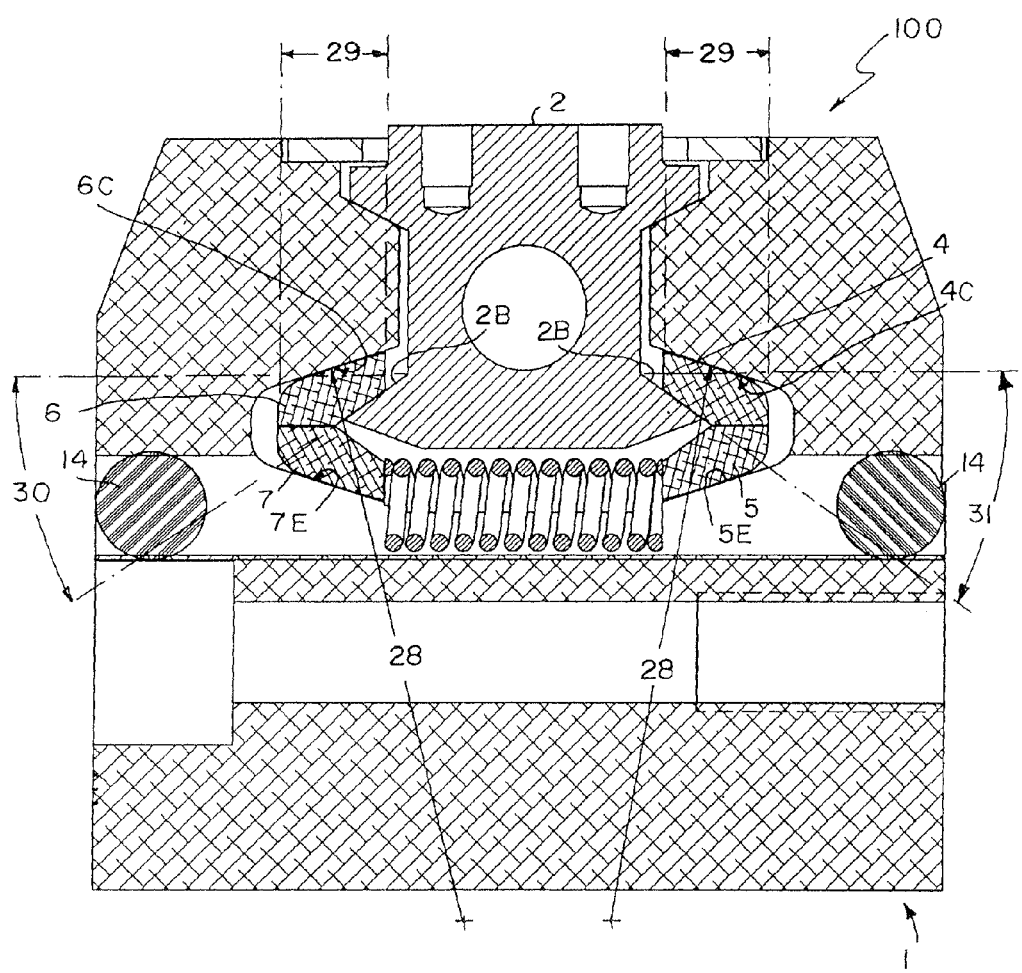
FIG. 6 is a cross-sectional end view of another illustrative embodiment of a gripper with crowned contact surfaces on the wedges.

Another embodiment of this disclosure includes more curved or crowned contact surfaces 28, as shown in FIG. 6. Surfaces 4C, 5E, 6C, and 7E incorporate a radius 28 large in magnitude relative to the width of each wedge, as indicated by reference numeral 29. Crowning 28 of surfaces 4C and 6C provides the desirable effect of allowing each wedge to rotate independently within body slot 1D to align with running surfaces 2B of wedge 2, regardless of variations in angles 30 and 31. Such variations may occur due to manufacturing tolerance or positioning of the jaw during assembly of the gripper. Aligning running surfaces promotes a favorable distribution of contact forces between wedge surfaces 4C and 6C and jaw surfaces 2B. The magnitude of radius 28 is chosen to be as large as possible to minimize the contact stresses between wedge surfaces 4C and 6C and body surface 1C while still allowing wedges 4 and 6 to rotate sufficiently to ensure alignment between wedge surfaces 4B and 6B and jaw surfaces 2B over the expected range of variation of angles 30 and 31. In an analogous fashion, crowning of surfaces 4C and 8C provides the desirable effect of allowing each wedge to rotate to align with the running surfaces of wedge 3.

Furthermore, wedges 5, 7, and 9, by virtue of sharing a common profile with wedges 4, 6, and 8, also possess a crowned surface in contact with surface 1E of body 1. The presence of a crown on surfaces 5E, 7E, and 9E allows each wedge to rotate independently within body slot 1D so that contacting surfaces 5D, 7D, and 9D can align with surfaces 4D, 6D, and 8D of wedges 4, 6, and 8, respectively. This alignment of surfaces provides the desirable effect of minimizing the contact stresses between the mating wedge surfaces.

Figure 7:
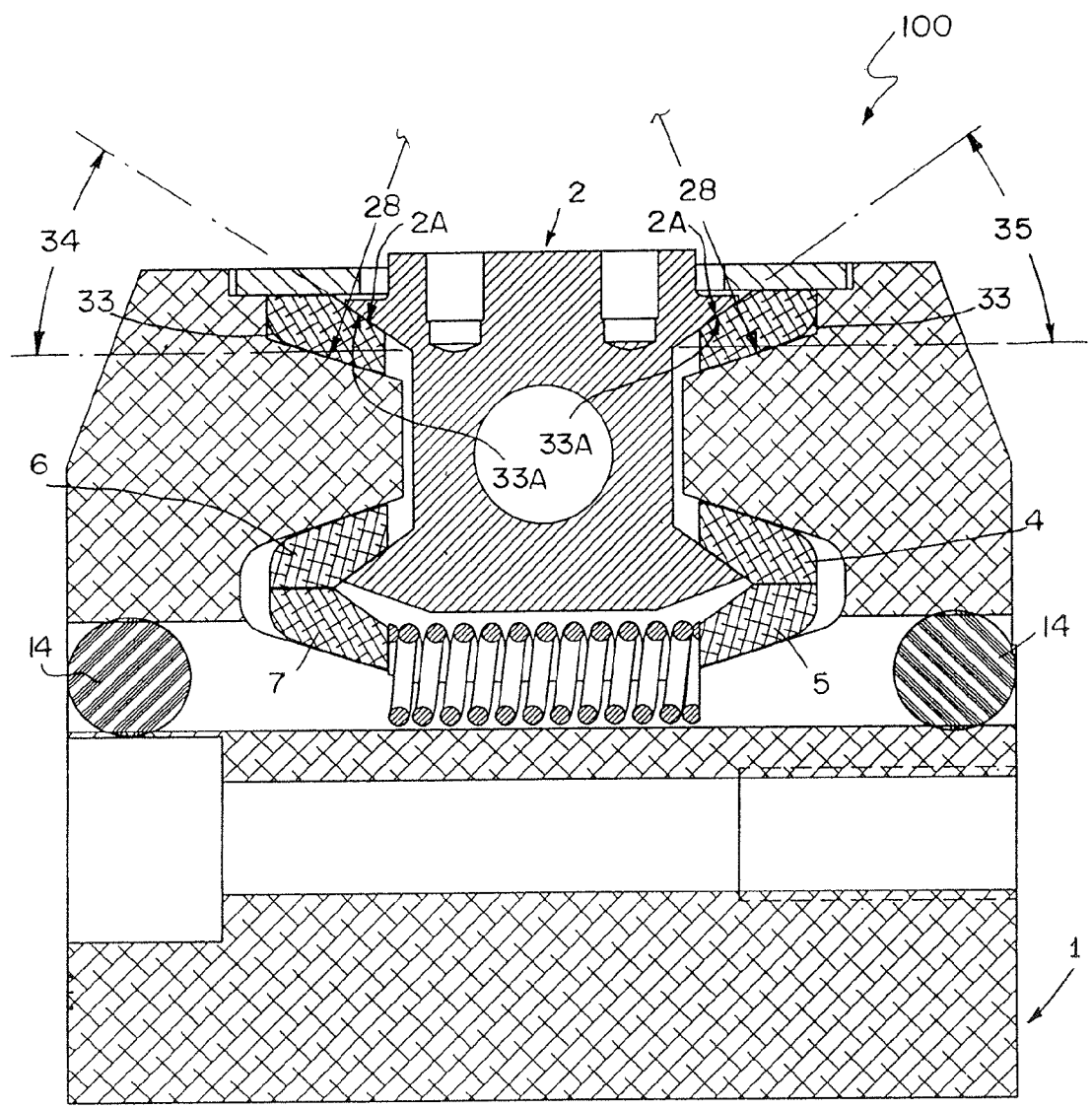
FIG. 7 is a cross-sectional view of another illustrative embodiment of a gripper with an upper set of wedges.

Another illustrative embodiment, shown in FIG. 7 includes crowned wedges at the upper running surfaces 2A and 3A of jaws 2 and 3, respectively. Illustratively, wedges 33 are disposed between body 1 and running surfaces 2A of jaw 2. Wedges 33 can share a common profile with wedges 4, 5, 6, 7, 8, and 9 so that the magnitude of radius 28 is the same as that described in previous embodiments. Crowning 28 of wedges 33 provides the desirable effect of allowing each wedge to rotate independently to align with running surfaces 2A of wedge 2, regardless of variations in angles 34 and 35 which may occur due to manufacturing tolerance or positioning of the jaw during assembly of the gripper. Such alignment of running surfaces promotes a favorable distribution of contact forces between wedge surfaces 33A and jaw surfaces 2A. Similarly, crowning wedges 33 allow each wedge to rotate to align with the running surfaces of wedge 3.

Figure 8:
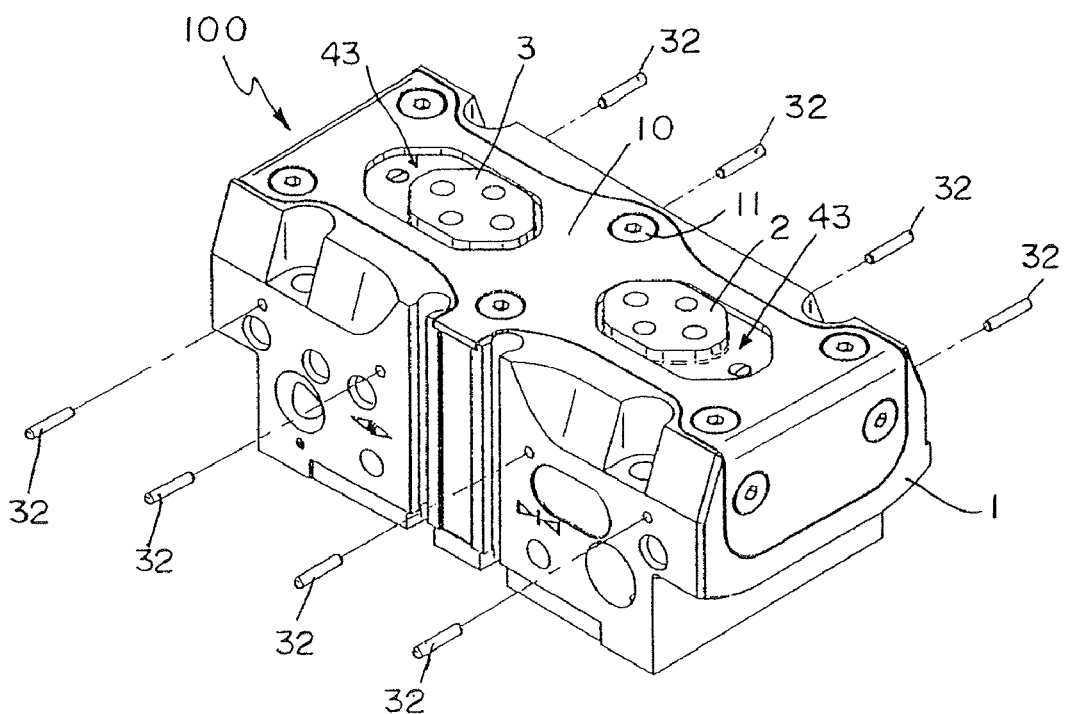
FIG. 8 is another perspective view of the gripper of FIG. 1.
Figure 9:
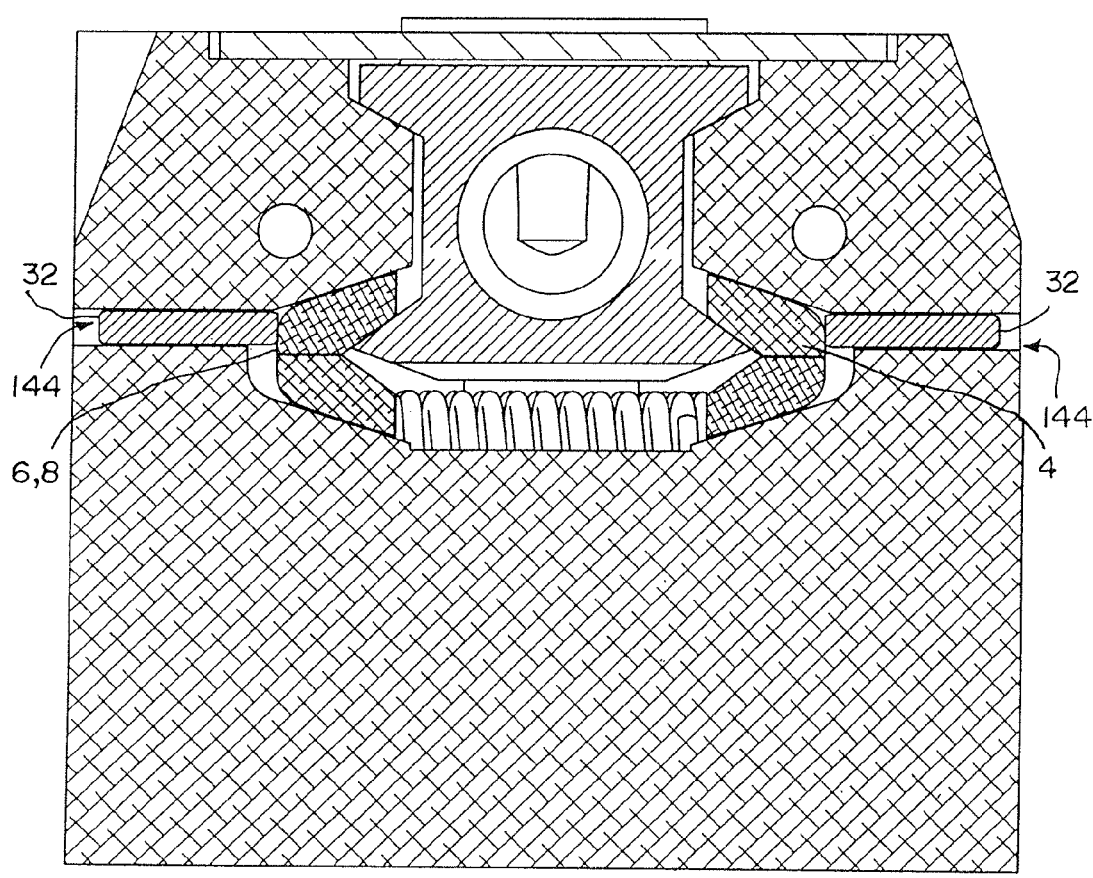
FIG. 9 is a cross-sectional end view of a gripper similar to that of FIGS. 8 and 1 showing dowel pins acting on wedges that engage a jaw.

In still another illustrative embodiment, as shown in FIGS. 8 and 9, a dowel pin wedge support is included in the gripper. Dowel pins 32 have been added. As previously described, springs 13A-F, acting upon wedges 5, 7, and 9, remove the running clearance from between jaws 2 and 3 and wedges 4, 6, and 8 and the running clearance from between jaws 2 and 3 and body 1. At such time as the running clearances are removed, pins 32 are positioned into bores 144 of body 1 with one face of the pin in contact with wedge 4, 6, or 8. A suitable adhesive can be applied to pin 32 to bond it to the inner cylindrical surface of bore 144. Pins 32 prevent external forces and moments acting on the jaws to displace wedges 4, 6, or 8 from their locations between body 1 and jaws 2 and 3. In addition, the presence of pins 32 obviates the need for the displacement of wedges 4, 6, and 8 to be prevented by the application of sufficient force from springs 13 to wedges 5, 7, and 9. The magnitude of the force applied by springs 13 can, therefore, be reduced below that required in other embodiments to prevent undesirable movement of the jaws away from the desired path of jaw motion. The reduced magnitude of the spring force also provides the benefit of subsequently reducing the running friction that retards the desired movement of the jaws along the desired path of jaw motion.

Another embodiment provides a reversible manifold as shown in FIGS. 10a-c. In the field of grippers, it can be advantageous to connect motive fluid means to the gripper using a manifold. Such manifolds conserve physical space by replacing two discrete threaded or press-fit tube-connecting fittings with a single sealed plate that simultaneously connects both fluid supply and exhaust lines to the gripper. Supply and exhaust ports suitable for manifold connection and separate ports suitable for the mounting of tube-connecting fittings are often both included on the same gripper. Typically, threaded plugs are used to seal-off unused manifold ports. Such plugs, however, add expense when installed during the manufacture of the gripper.

Cover 20 and gasket 19 may be constructed to obviate the use and associated expense of plugs to seal-off unused manifold ports. For example, as shown in FIG. 10a, the orientation of cover 20 exposes manifold ports 20A positioned at the bottom of the gripper. In this orientation, ports 20A align with fluid conductive features in the "ears" 19A of gasket 19 allowing motive fluid to enter and exit the gripper. As shown in FIG. 10b the orientation of cover 20 can be changed illustratively by rotating 180° to position manifold ports 20A on the opposite side of the gripper. As shown in FIG. 10c, cover 20 positions manifold ports 20A over ears 19B of gasket 19. In this orientation ports 20A are now sealed-off from contaminant ingress with the assistance of ears 19B of gasket 19, while the fluid conductive features of ears 19A are sealed-off to prevent the egress of motive fluid by contact with the surface of cover 20.

Figure 11A:
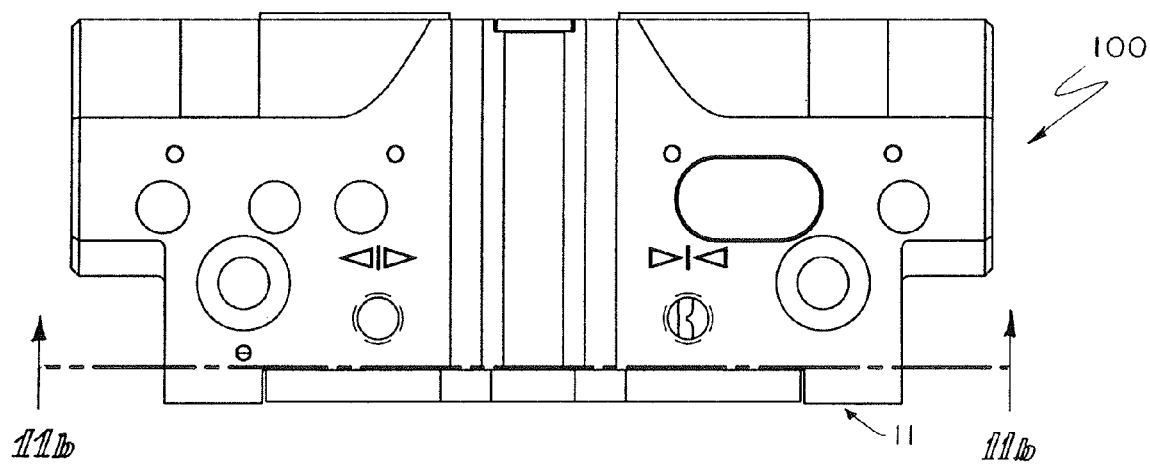
FIGS. 11a and b are a side view and top cross-sectional view of a gripper demonstrating an interlocking gasket.
Figure 11B:
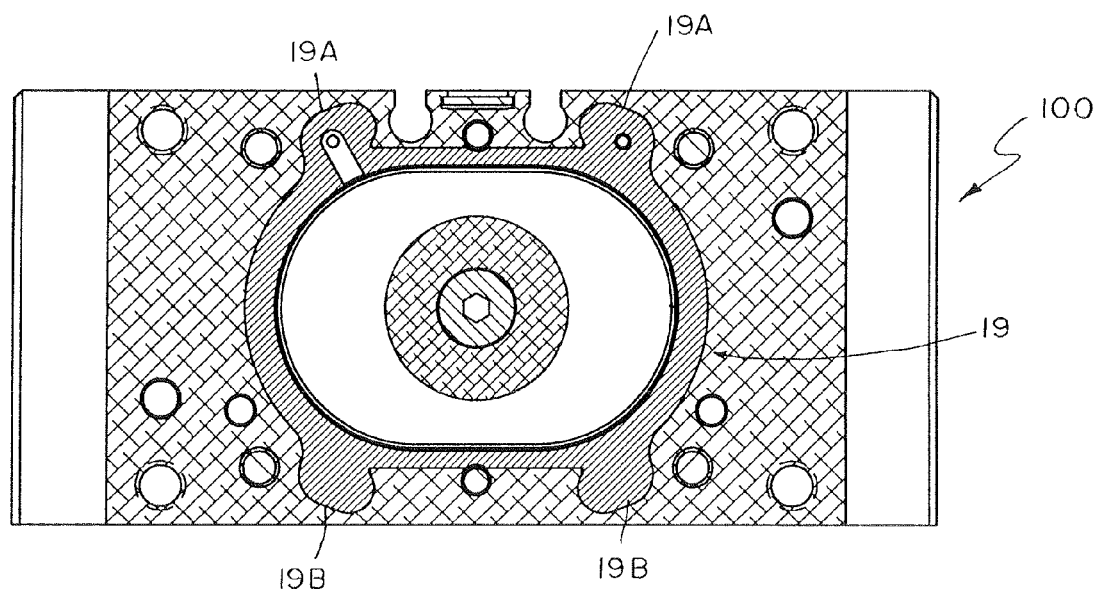

Another embodiment of this disclosure includes an interlocking gasket. Gaskets, as sealing members, have historically suffered from a tendency to extrude from between the surfaces to be sealed under a compression load. As shown in FIG. 11, "ear" profiles 19A and 19B of gasket 19 interlock into complimentary recesses in body 1 to preclude this extrusion of gasket.

Figure 12A:
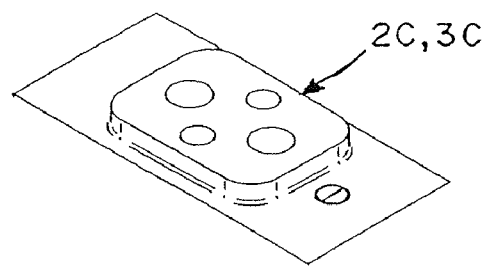
FIGS. 12a-c are various profiles of a jaw that can be used in the gripper shown in prior views.
Figure 12B:
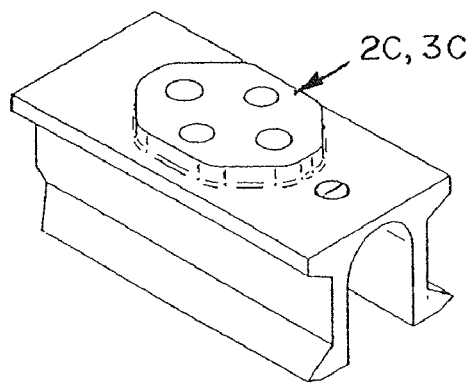
Figure 12C:
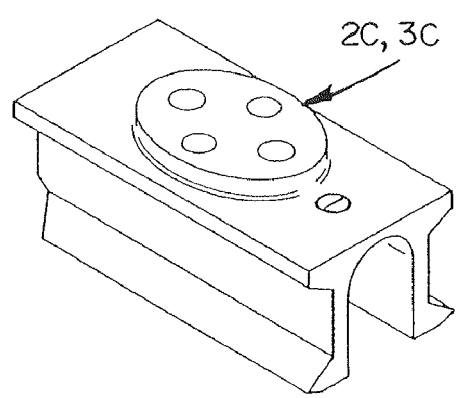

Another embodiment of this disclosure includes a diamond profile tooling pad on the jaws. Distortion, such as warping or twisting, of the running surfaces of the jaws may occur when tooling used to grip objects is attached to tooling surfaces 2C and 3C with threaded fasteners. This distortion may induce increased friction between the running surfaces of the jaws and abutting guiding surfaces when the magnitude of the distortion is greater than the amount of running clearance. As shown in FIG. 12a, a typical prior art tool pad is rectangular. In contrast as shown in FIGS. 12b and c, diamond, quazi-diamond, or oval-shaped pads may have the effects of reducing deleterious distortion. Distortion of the running surfaces of a jaw occurs when the tooling surface of the jaw is drawn tight against the surface of the attached tooling by the action of the threaded fasteners. The abutting surfaces of the jaw and attached tooling may not be completely planer (flat) with respect to one another. The finite gaps that may exist cause the abutting surfaces to warp and/or twist to come into contact with one another. Distortion of the tooling pad surface propagates to the rest of the jaw structure, with the amount of distortion of a running surface directly proportional to the physical proximity of that running surface to the profile of the tooling pad. By removing the corners of the square tooling pad to form the diamond, quazi-diamond, or oval-shaped pad, the distances between the ends of the running surfaces and the tooling pad profile are increased, thereby limiting the area of significant jaw distortion to the center area of the running surfaces, rather than both the center and end areas.

Figure 13A:
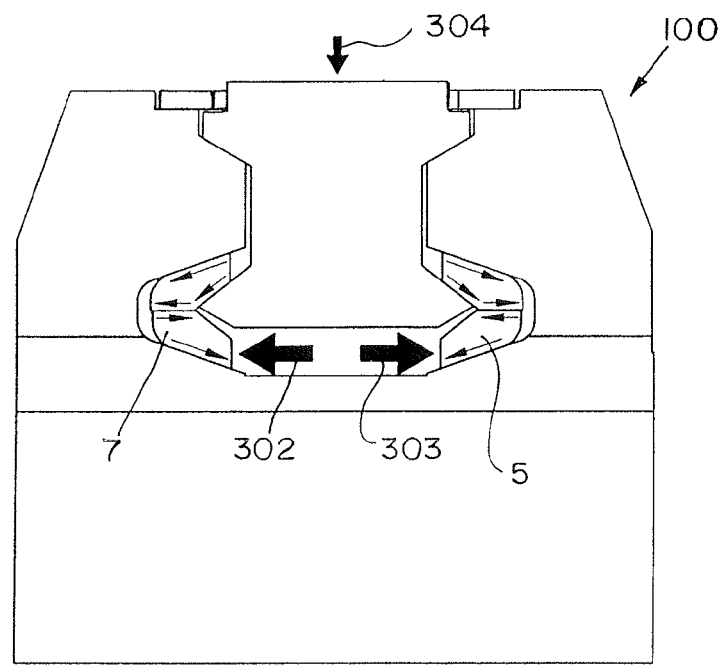
FIGS. 13a and b are cutaway end views of the gripper previously shown demonstrating the behavior of friction forces from a bias acting on wedges in the gripper.
Figure 13B:
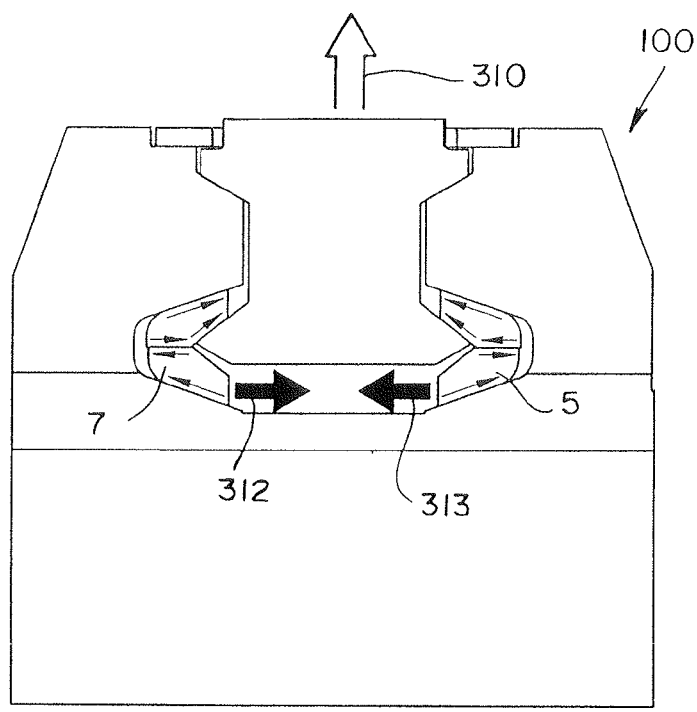

The cutaway end views of gripper 100 shown in FIGS. 13a and b demonstrate the behavior of friction due to the action of springs 13 against the lower set of wedges 5, 7, and 9. As shown in FIG. 13a the size relationship between the two force arrows 302 and 303 acting on wedges 5 and 7 and the small force arrow 304 acting downward at the top of the jaw is intended to show how the forces applied by the springs are diminished by the effects of friction until only a small force remains acting on the jaw 2. As view FIG. 13b demonstrates, the behavior of friction is due to an external force 310 applied to jaw 2. The size relationship between the large force arrow 310 acting upward at the top of jaw 2 and the two force arrows 312 and 313 acting on wedges 5 and 7 is intended to show how a large force applied to jaw 2 is diminished by the effects of friction until only a small force remains acting on springs 13.

Figure 14:
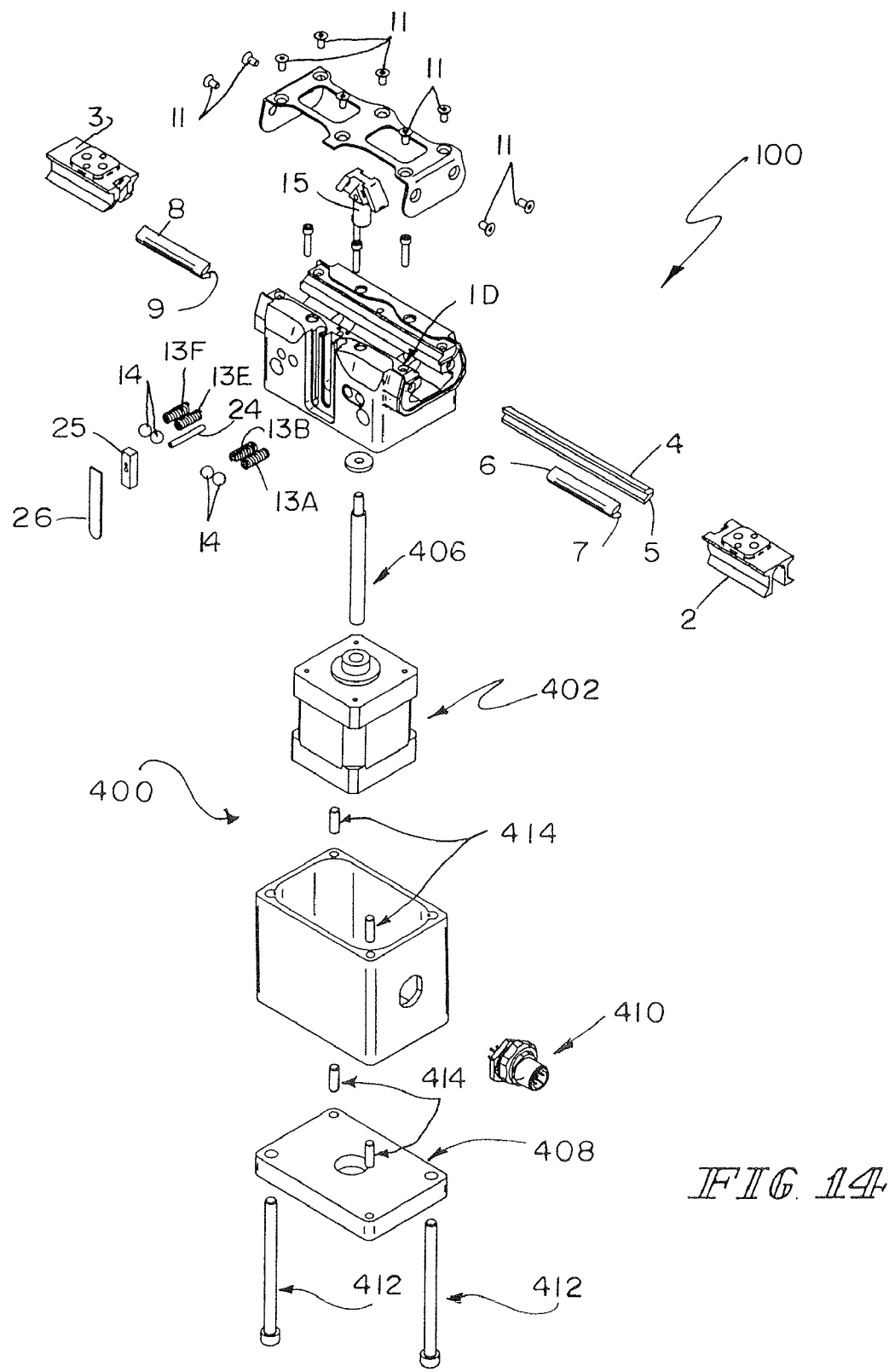
FIG. 14 is an exploded view of another illustrative embodiment of a gripper powered using an electric motor.

Another illustrative embodiment of gripper 100 is shown in FIG. 14. Driving gripper 100 in this case is an electric motor assembly 400 instead of a pneumatic actuator. Illustratively, a motor 402 rotates a nut with threads of nut engaging mating threads on exterior of drive rod 406. Drive rod 406 is prevented from rotating by driver 15 so that rotational motion of nut is converted to linear motion of drive rod. Motor 402 may be located in housing 404 and receives power through plug 410. Cap 408 may be located on the end of housing 404 attaching the same to body 1 via fasteners 412. Alignment pins 414 ensure motor 402 and housing 404 are positioned properly.

Various side and cross-sectional views of gripper 100 are shown in FIGS. 15a-c and 16a-d. These views show more of the internal mode of source that drives jaws 2 and 3. The side end views shown in FIGS. 15a and b indicate the several slice lines for the cross-sectional views in the remainder of FIGS. 15 and 16. The view in FIG. 15c is similar to that of FIG. 3, except the section is taken along A-A of FIG. 15a and shows driver 15 in jaw 3. Elastomer balls 14 are shown plugging boards 132, as previously discussed. And spring 13c biases wedges 6, 7, 4, and 5. Also shown are dowels 32 engaging wedges 4 and 6. This view, like others, also shows how the running clearance between projections 133 of jaw 3 and wedges 4 and 6 is reduced if not eliminated.

The section view along section C-C in FIG. 16a shows the interaction between driver 15 and jaws 2 and 3. This view also shows piston 16 that drives driver 15. FIG. 11b shows again jaw 2 being retained by cover 10 and any running clearance between projections 123 and wedges 4 and 6 is reduced if not eliminated assisted by spring 13a and dowels 32. A view of FIG. 16c shows not only the driving components, such as distance 16 and driver 15 that move jaw 2, but also sensor components that detect the placement of the jaws, such as roll pin 24 and switch target 25 as previously discussed. The view of 16d shows further the positioning of internal components with respect to each other, such as jaw 2, driver 15, wedges 6 and 7, projections 123, and dowel 12 in bore 130.

Figure 17:
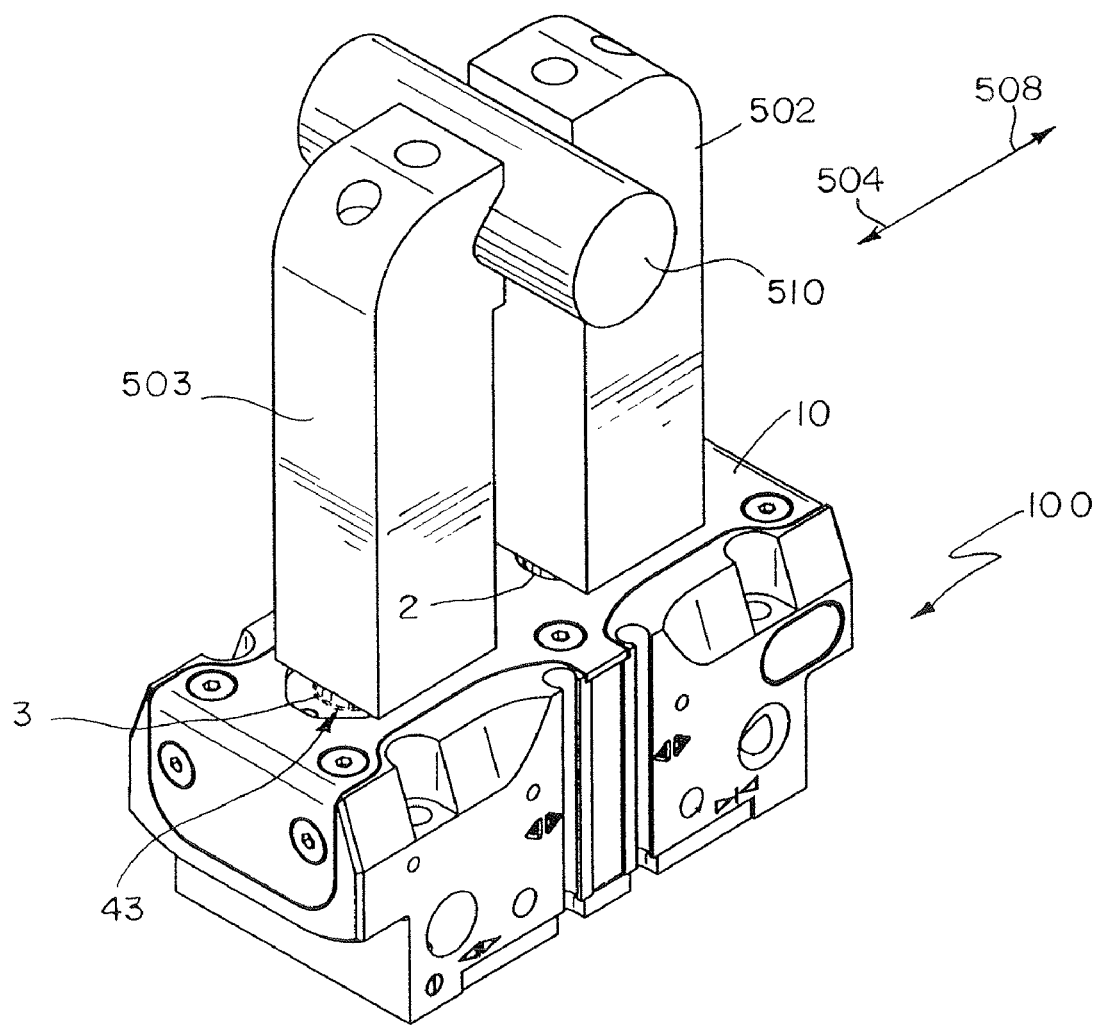
FIG. 17 is a perspective view of the gripper of FIG. 1 with clamping arms attached.

Lastly, a perspective view of gripper 100 demonstrating one of its utilities is shown in FIG. 17. Gripper 100 can be used on assembly lines to selectively hold any myriad of items. Illustrative jaw arms 502 and 503 may be attached to jaws 2 and 3, respectively. Jaws 2 and 3 move reciprocally in directions 504 and 508 moving arms 502 and 503 between opened and closed positions. Clamping arms 502 and 503 together means they can hold a workpiece such as Workpiece 10 shown in the drawings. Conversely, moving clamping arms 502 and 503 in the opposite direction open them thereby releasing workpiece 10.

Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

What is claimed is:

1. A gripper assembly comprising,
a body having a slot disposed therein;
wherein the slot has opposed longitudinally extending walls;
at least one jaw laterally slideable within the slot;
a longitudinally extending wedge, fitted along at least one longitudinally extending wall and between the jaw and one longitudinally extending wall;
wherein the at least one jaw comprises a longitudinally extending surface that is engageable with the wedge; and
wherein the surface of the jaw is slideable along the wedge; and
a spring configured to bias the wedge from the one longitudinally extending wall toward the jaw.

2. The gripper assembly of claim 1, wherein the jaw further comprises a projection extending from the jaw and includes the longitudinally extending surface that is engageable with the wedge.

3. The gripper assembly of claim 2, wherein the jaw further comprises a second projection extending from the jaw and opposite the first projection.

4. The gripper assembly of claim 3, wherein the jaw further comprises third and fourth projections extending from the jaw and spaced apart from the first and second projections.

5. The gripper assembly of claim 1, further comprising a longitudinally extending second wedge that abuts the wedge, and wherein the spring engages the second wedge biasing it against the first wedge toward the jaw to reduce running clearance between the wedge and the jaw.

6. A gripper assembly comprising,
a body having a slot disposed therein;
wherein the slot has opposing walls;

wherein each of the opposed walls include a longitudinally extending recess;

a jaw that is slidable within the slot;

first and second longitudinally extending wedges that abut each other, are positioned in one of the longitudinally extending recesses and between the jaw and the longitudinally extending recess, and wherein the first extending wedge is configured to engage the jaw;

third and fourth longitudinally extending wedges that abut each other, positioned in the other of the longitudinally extending recesses and between the jaw and the other longitudinally extending recess, and wherein the third extending wedge is configured to engage the jaw; and a spring that biases the second and fourth wedges causing a reduction of running clearance between the first and third wedges.

7. The gripper assembly of claim 6, further comprising a third set of wedges that engage the jaw and opposing slot walls, and is adjacent the third and fourth wedges.

8. The gripper assembly of claim 6, wherein the first and third wedges have a radiused corner transverse to the longitudinal extent of the first and third wedges.

9. The gripper assembly of claim 8, wherein the second and fourth wedges have a radiused corner transverse to the longitudinal extent of the first and third wedges.

* * * * *